(12) United States Patent
Barker (10) Patent No.: US 6,928,339 B2
(45) Date of Patent: Aug. 9, 2005

(54) GPS-BASED CONTROL SYSTEM AND METHOD FOR CONTROLLING MECHANIZED IRRIGATION SYSTEMS

(75) Inventor: Luke J. Barker, Deshler, NE (US)

(73) Assignee: Reinke Manufacturing Company, Inc., Deshler, NE (US)

( * ) Notice: Subject to any disclaimer, the term of this patent is extended or adjusted under 35 U.S.C. 154(b) by 247 days.

(21) Appl. No.: 10/302,373

(22) Filed: Nov. 21, 2002

(65) Prior Publication Data

US 2004/0117070 A1 Jun. 17, 2004

(51) Int. Cl.$^7$ .............................. B05B 3/00; G05D 7/00
(52) U.S. Cl. ...................................... 700/284; 239/739
(58) Field of Search .............................. 239/727–733, 239/739–743, 722, 723, 726; 700/284; 702/2; 701/207, 213–216

(56) References Cited

U.S. PATENT DOCUMENTS

| | | | |
|---|---|---|---|
| 3,797,517 A | 3/1974 | Kircher et al. | 137/344 |
| 3,902,668 A | 9/1975 | Daugherty et al. | 239/177 |
| 4,033,508 A | 7/1977 | Jacobi et al. | 239/177 |
| 4,340,183 A | 7/1982 | Kegel et al. | 239/710 |
| 4,569,481 A | * | 2/1986 | Davis et al. | 239/729 |

(Continued)

FOREIGN PATENT DOCUMENTS

WO   WO 98/46065   10/1998

OTHER PUBLICATIONS

Buchleiter, Gerald W., et al., "Performance of Nondifferential GPS to Determine Sprinkler Position," ASAE International Meeting, 1998.

*Primary Examiner*—Maria N. Von Buhr
(74) *Attorney, Agent, or Firm*—Jeffrey L. Thompson; Thompson & Thompson, P.A.

(57) ABSTRACT

A GPS-based control system for irrigation systems includes a power supply, a nonvolatile memory for storing a first set of coordinates corresponding to a reference position for the irrigation system, circuitry for receiving GPS data and using the data to generate a second set of coordinates corresponding to a current position of the irrigation system, and a microprocessor for calculating the azimuth and the distance between the reference position and the current position using the first and second sets of coordinates. The control system communicates with a main controller of the irrigation system to control a function of the irrigation system, such as stopping, reversing, end gun operation, application rate, or other auxiliary output, at a selected distance or azimuth value of the current position relative to the reference position. The control system can be used with either a center pivot irrigation system or a linear move irrigation system.

23 Claims, 6 Drawing Sheets

U.S. PATENT DOCUMENTS

| | | | | |
|---|---|---|---|---|
| 4,795,099 A | * | 1/1989 | Wolfbauer et al. | 239/733 |
| 4,839,656 A | | 6/1989 | O'Neill et al. | 342/357 |
| 5,450,329 A | | 9/1995 | Tanner | 364/449 |
| 5,549,412 A | | 8/1996 | Malone | 404/84.1 |
| 5,572,218 A | | 11/1996 | Cohen et al. | 342/357 |
| 5,684,476 A | | 11/1997 | Anderson | 340/988 |
| 5,740,038 A | | 4/1998 | Hergert | 364/420 |
| 5,809,440 A | | 9/1998 | Beck et al. | 701/50 |
| 5,845,229 A | | 12/1998 | Rawlins | 702/2 |
| 5,884,224 A | * | 3/1999 | McNabb et al. | 702/2 |
| 5,919,242 A | * | 7/1999 | Greatline et al. | 701/50 |
| 5,927,603 A | | 7/1999 | McNabb | 239/63 |
| 5,991,694 A | * | 11/1999 | Gudat et al. | 702/2 |
| 6,036,122 A | * | 3/2000 | Gerdes et al. | 239/729 |
| 6,045,066 A | | 4/2000 | Gerdes et al. | 239/729 |
| 6,085,999 A | * | 7/2000 | Gerdes et al. | 239/729 |
| 6,095,439 A | | 8/2000 | Segal et al. | 239/729 |
| 6,108,590 A | * | 8/2000 | Hergert | 700/284 |
| 6,199,000 B1 | * | 3/2001 | Keller et al. | 701/50 |
| 6,254,018 B1 | | 7/2001 | Ostrom | 239/731 |
| 6,290,151 B1 | | 9/2001 | Barker et al. | 239/729 |
| 6,314,348 B1 | * | 11/2001 | Winslow | 701/23 |
| 6,512,992 B1 | * | 1/2003 | Fowler et al. | 702/150 |
| 6,522,948 B1 | * | 2/2003 | Benneweis | 700/243 |
| 6,666,384 B2 | * | 12/2003 | Prandi | 239/1 |
| 6,678,580 B2 | * | 1/2004 | Benneweis | 700/237 |
| 6,708,080 B2 | * | 3/2004 | Benneweis | 700/242 |
| 6,726,132 B2 | * | 4/2004 | Malsam | 239/729 |
| 6,755,362 B2 | * | 6/2004 | Krieger et al. | 239/731 |
| 2002/0008167 A1 | * | 1/2002 | Haberland et al. | 239/722 |
| 2002/0066810 A1 | * | 6/2002 | Prandi | 239/728 |
| 2002/0134868 A1 | * | 9/2002 | Hansen | 239/728 |

* cited by examiner

GPS-BASED CONTROL SYSTEM AND METHOD FOR CONTROLLING MECHANIZED IRRIGATION SYSTEMS

BACKGROUND OF THE INVENTION

1. Field of the Invention

The present invention relates generally to mechanized irrigation systems. In particular, the present invention relates to a GPS-based control system for determining the angular position of a center pivot irrigation system, or for determining the distance traveled by a linear move irrigation system, and using the information to control a function of the irrigation system.

2. Description of the Related Art

Mechanized sprinkler irrigation systems are widely used throughout the world to provide water for agricultural purposes in arid regions. Typically, such systems include a series of spaced support towers connected by truss sections that support an elevated water distribution pipe between the towers. In center pivot systems, the water distribution pipe extends radially from a central pivot communicating with a pressurized water supply. In linear move irrigation systems, the water distribution pipe extends laterally from a canal feed or hose drag system that provides a pressurized water supply.

Water passing through the distribution pipe is forced out through a number of sprinkler heads, spray guns, drop nozzles, and the like, spaced along the length of the pipe. Each tower in the system is supported on wheels that are driven at slow speeds to move the tower in a circular path about the central pivot, or a linear path in the case of linear move systems, to thereby irrigate a large tract of land.

Mechanized irrigation systems, particularly center pivot irrigation systems, are often provided with high pressure sprayers, known as end guns, which are mounted on the end tower. The end guns are activated at the corners of the field or other areas to increase the amount of area that can be irrigated by the irrigation system. Booster pumps are often associated with the end guns to increase the water pressure to the end gun for providing an even larger watering pattern.

A growing number of mechanized irrigation systems employ some sort of electronic controls. These controls allow the operator to program the irrigation system to operate to his specific need. Generally, these controllers can change application rate, control end gun functions, and automatically stop or reverse the system anywhere in the field. These controllers can also be used to shut off selected towers or nozzles at predetermined locations in the field or to control other functions of the sprinkler system. In the case of center pivot sprinkler systems, the system moves in a circular path and the standard positioning value to the operator is in degrees. Zero degrees (0°) is typically straight north and 180 degrees (180°) is straight south. In the case of linear move irrigation systems, the system moves in a straight path and the standard positioning value to the operator is in distance traveled from a reference point.

The current means of indicating the position of a pivot irrigation system is by mounting an encoder at the center of the pivot inside of a slip ring assembly. The encoder then only moves when the first tower from the center moves. The encoder does not provide positive feedback of when the end tower is moving. As a result, the end gun is not always activated at the most advantageous position of the end tower, and it is difficult to stop, reverse and/or change the speed of the system accurately because the exact location of the end tower is not known.

Until recently the use of Global Positioning Satellite (GPS) data to locate the end tower of a center pivot irrigation system would have been impractical from the standpoint that such position calculations were too inaccurate and GPS receiver/senders were prohibitively expensive. However, the FAA recently launched a satellite that can send corrections to any GPS receiver and decrease positioning errors to about 15 feet. The signal used by the FAA satellite is called WAAS or Wide Area Augmentation System. GPS receivers receive the WAAS signal using the same antenna as the GPS signals.

WAAS is based on a network of approximately 25 ground reference stations that cover a very large service area. Signals from GPS satellites are received by wide area ground reference stations (WRSs). Each of these precisely surveyed reference stations receives GPS signals and determines if any errors exist. These WRSs are linked to form the United States WAAS network. Each WRS in the network relays the data to the wide area master station (WMS) where correction information is computed. The WMS calculates correction algorithms and assesses the integrity of the system. A correction message is prepared and uplinked to a geosynchronous satellite via a ground uplink system (GUS). The message is then broadcast from the satellite on the same frequency as GPS (L1, 1575.42 MHz) to receivers which are within the broadcast coverage area of the WAAS.

There is a need in the industry for an improved control system that uses GPS to accurately detect the angular position of a center pivot irrigation system, or to accurately detect the distance traveled by a linear move irrigation system, and that uses such information to control various functions of the irrigation system.

SUMMARY OF THE INVENTION

It is an object of the present invention to provide an improved GPS-based control system for controlling various functions of a sprinkler irrigation system with a high degree of accuracy and consistency.

It is a further object of the present invention to provide a GPS-based control system that can be used with either a center pivot irrigation system or a linear move irrigation system.

It is a further object of the present invention to provide a reliable and economical GPS-based control system for a sprinkler irrigation system that requires only one GPS receiver to determine the position of the sprinkler system.

It is a further object of the present invention to provide a system and method for controlling the end gun operation of a center pivot sprinkler irrigation system, which is easy to set up and provides a high degree of accuracy.

It is a further of the present invention to provide a GPS-based control system that is economical to manufacture, efficient in use, capable of a long operating life, and particularly well suited for use in both pivot and linear move sprinkler irrigation systems.

To accomplish these and other objects, a GPS-based control system for mechanized irrigation systems is provided which includes a power supply, a nonvolatile memory for storing a first set of coordinates corresponding to a reference position for the irrigation system, a GPS antenna, a GPS receiver, and a microprocessor. The GPS antennae and GPS receiver are used to receive GPS data, which is used to generate a second set of coordinates corresponding to a current position of the irrigation system. The microprocessor is used to calculate the azimuth and the distance between the reference position and the current position using the first and second sets of coordinates.

The control system communicates with a main controller of the irrigation system to control at least one function of the irrigation system at a predetermined distance or azimuth value of the sprinkler position relative to the reference position. The azimuth value generated by the control system can be used with a center pivot irrigation system, while the distance value can be used with a linear move irrigation system. The control system can be used, for example, to control end gun operation, stopping, reversing, application rate, or other functions of the irrigation system at predetermined locations as the sprinkler moves across the irrigated field.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A GPS-based controller for irrigation systems according to the present invention will now be described with reference to FIGS. 1 to 5 of the accompanying drawings.

Figure 1:
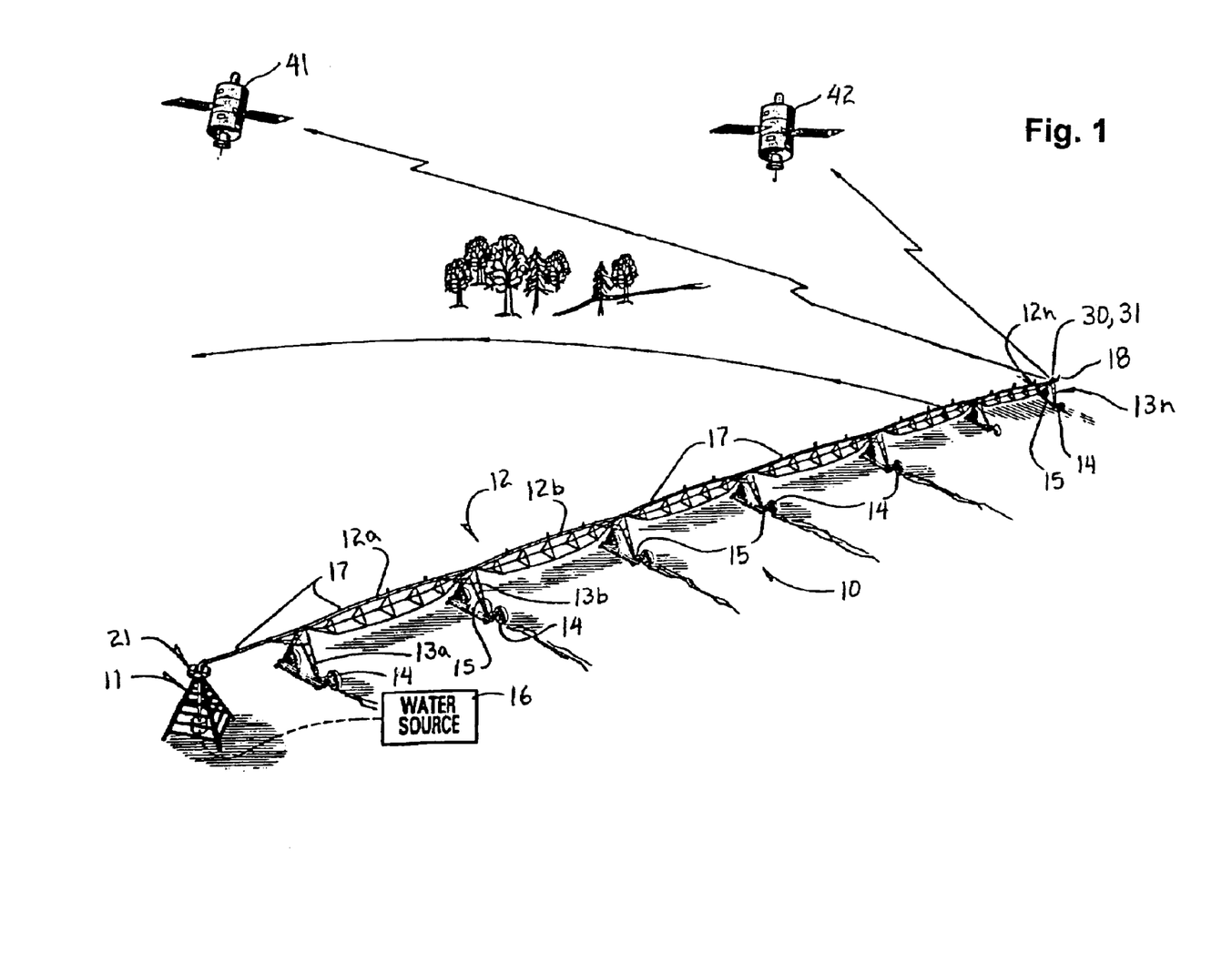
FIG. 1 is a pictorial diagram showing a center pivot irrigation system having a GPS-based controller positioned on the end tower for controlling one or more functions of the irrigation system based on the calculated azimuth between the center pivot point and the end tower.
Figure 2:
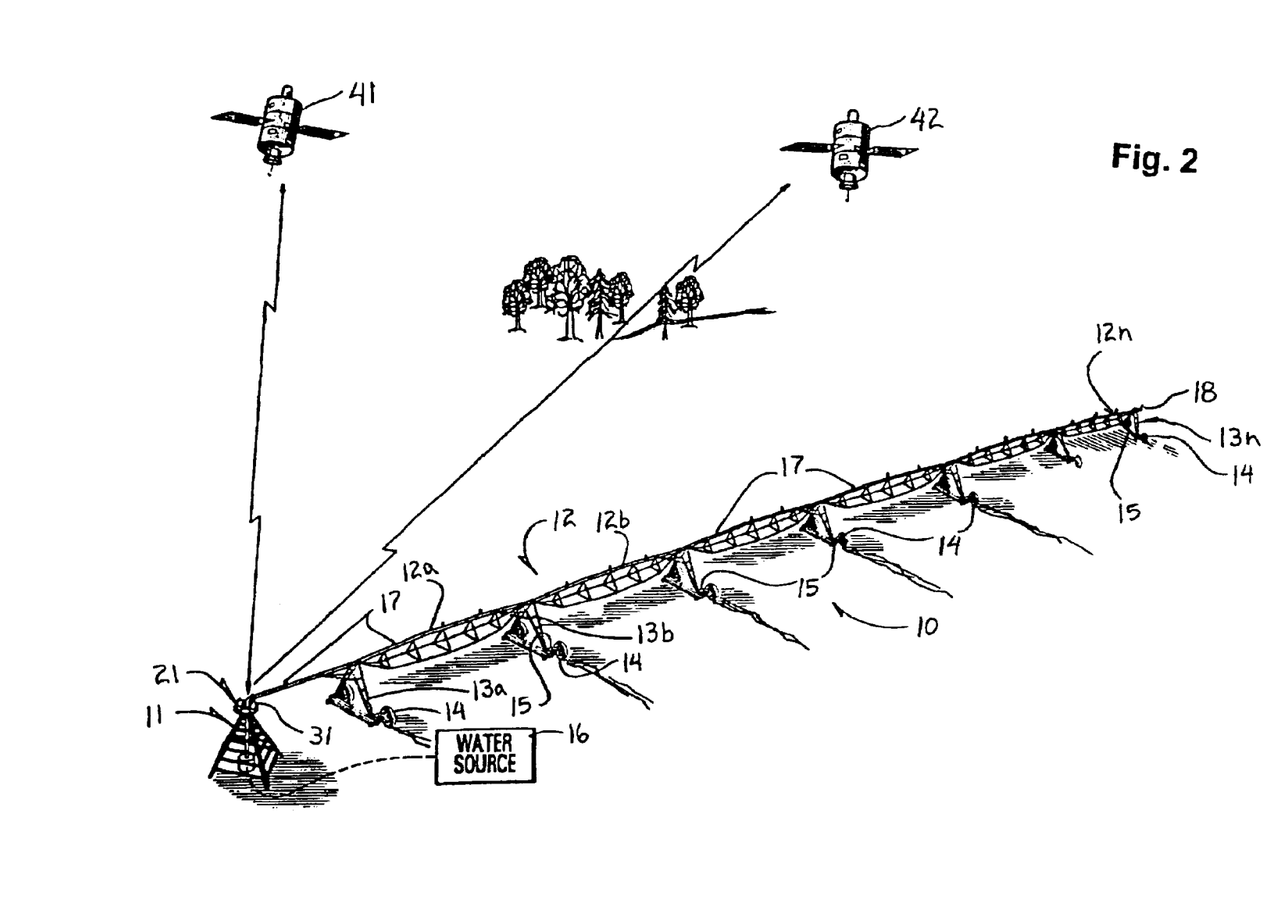
FIG. 2 is a pictorial diagram showing the center pivot irrigation system in a setup mode with the GPS-based controller positioned at the center pivot point to program the controller with the coordinates of the center pivot point.

The GPS-based controller of the present invention will first be described in conjunction with a center pivot sprinkler irrigation system 10. A center pivot 11 for the irrigation system 10 is stationary and connected to a main boom 12, which can be comprised of several separate boom sections 12a, 12b . . . 12n. The boom sections 12a–12n are supported by support towers 13a–13n, each of which have wheels 14 and drive motors 15 for mobility.

The center pivot 11 is connected to a source of water, such as a well 16. Water is supplied from the well 16 along the lengths of the main boom 12 for delivering a desired amount of water to a plurality of sprinkler heads 17, which are spaced along the lengths of the boom sections 12a–12n. Water is also delivered through the main boom 12 to an end gun assembly 18 positioned at the outer end of the end boom section 12n. The end gun assembly 18 typically includes a booster pump 19 and a spray nozzle 20 for applying irrigation water to areas of the field outside the circular area traversed by the boom sections 12a–12n (e.g., into the corners of a square field).

A main controller 21 is positioned at the center pivot point 11 or at another convenient location to control the operation of the irrigation system 10. The main controller 21 typically includes basic speed controls, direction, start/stop, end gun and auto reversing control functions. The main controller 21 can also be programmed for custom water and chemical applications, and can be equipped with a phone link for remote monitoring and control using a telephone. The main controller 21 is connected to the various electrical components, such as the drive motors 15 and the end gun booster pump 19, by suitable electrical wiring for energizing the electrical components during operation of the sprinkler system 10.

Figure 3:
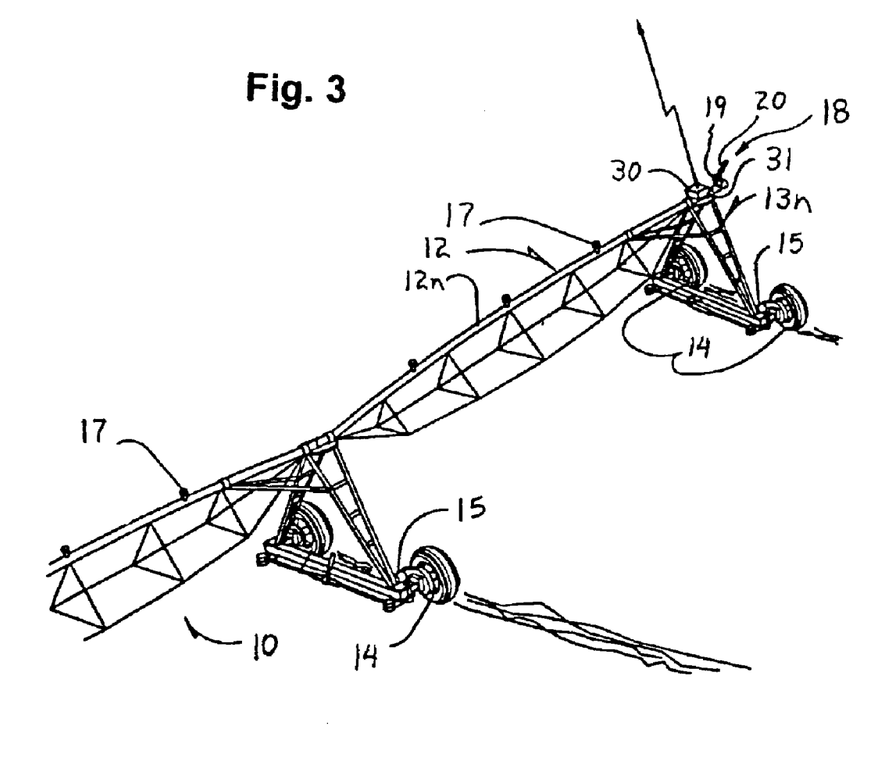
FIG. 3 is a more detailed view of the end tower of the irrigation system shown in FIGS. 1 and 2, which shows an end gun controlled by the GPS-based controller of the present invention.

A GPS-based controller 30 according to the present invention will now be described. For center pivot irrigation systems 10, the control unit 31 of the GPS-based controller is normally mounted on the end tower 13n near the end gun assembly 18, as shown in FIGS. 1 and 3. However, prior to mounting the control unit 31 on the end tower 13n, the control unit 31 can be located temporarily at the center pivot point 11, as shown in FIG. 2, and programmed with the exact latitude and longitude coordinates of the center pivot point 11.

Figure 4:
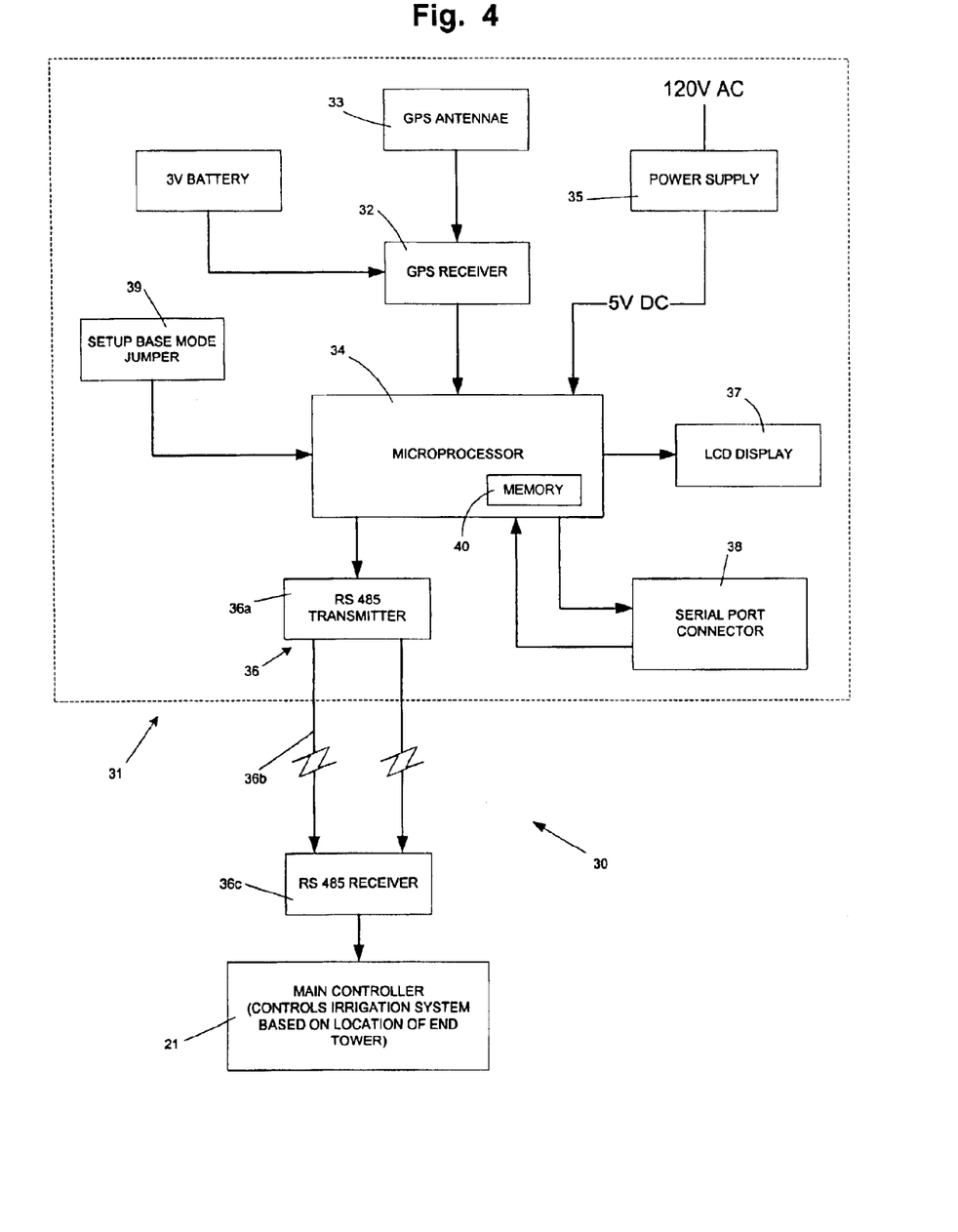
FIG. 4 is a block diagram of the main electrical components of the GPS-based controller of the present invention.

As shown in FIG. 4, the control unit 31 includes a GPS receiver 32 with WAAS enabled, a GPS antenna 33, a microprocessor 34, a power supply 35, and transmitting and receiving circuitry 36. The power supply 35 provides 120 Vac to 5 vdc conversion. The microprocessor 34 takes care of the math functions that must be performed to calculate the distance and azimuth of the end tower 13n relative to the center pivot point 11. The transmitting and receiving circuitry 36 can be any suitable communications devices capable of transmitting and receiving data over long distances, such as RS485 chips connected by twisted pair wires. An LCD display 37 is used to provide a visual indication of the data generated by the microprocessor 34.

The initial setup for the control unit 31 when used on a center pivot irrigation system 10 requires that the microprocessor 34 be programmed with the latitude and longitude of the center pivot point 11. This can be achieved by keyboard input using a serial port connector 38, or by temporarily mounting the GPS receiver 32 and GPS antenna 33 at the pivot center 11, plugging in a jumper 39 for "base setup" mode, and then powering the unit 31. Upon power up, the unit 31 will search for satellites 41, 42 and WAAS signal using the GPS antennae 33 and the GPS receiver 32. When there are sufficient satellites 41, 42 in view and the WAAS signal is detected, the unit 31 will detect the presence of the base setup mode jumper 40 and will go into a "learn" mode and average the position of the pivot center 11 based on the signals detected by the GPS receiver 32. When the averaging is done, the latitude and longitude of the center pivot point 11 are saved in a nonvolatile memory 40 as a first set of coordinates.

Once the pivot center coordinates are known and programmed into the nonvolatile memory 40, the control unit 31 can be mounted on the end tower 13n. Upon power up (with the base setup jumper 39 removed), the unit 31 will search for satellites 41, 42 and WAAS signal using the GPS antennae 33 and the GPS receiver 32. When there are sufficient satellites 41, 42 in view and the WAAS signal is present, the GPS receiver 32 will generate a second set of latitude and longitude coordinates corresponding to a current position of the end tower 13n of the irrigation system 10. The GPS receiver 32 outputs industry standard data packets to the microprocessor 34. These data packets include: time of day, date, latitude, longitude, number of satellites, and some signal quality factors.

The latitude and longitude of the end tower 13n (i.e., the second set of coordinates) are compared to the latitude and longitude of the pivot center 11 (i.e., the first set of coordinates stored in the nonvolatile memory 40). The microprocessor 34 performs basic math functions that take the first and second sets of coordinates and calculate the distance and azimuth between the two points (i.e., between the pivot center 11 and the end tower 13n). The azimuth or angular value is the only value used for center pivot irrigation systems 10 because the distance value will remain the same in such systems. On the other hand, the distance value will typically be the only value used for linear move systems, as described below, because the azimuth or angular value will remain the same in such systems.

In a preferred embodiment, an output value of 0 to 4095 is transmitted from the control unit 31 to the main controller 21 using a suitable communication means. This output value is an industry standard 12 bit value that corresponds to the angular position of the irrigation system about the center pivot point of 0 to 359.9 degrees. The conversion from the 12 bit value (0 to 4095) to degrees (0 to 359.9 degrees) is done in the main controller 21.

In the preferred embodiment, the output value is transmitted via an RS485 chip 36a associated with the control unit 31 through a twisted pair wire 36b to the main controller 21 at the pivot center 11 (or other remote location). A second RS485 chip 36c is provided at the main controller 21 for receiving the output from the twisted pair wire 36b. Other industry standard output and data transmission methods could also be used (e.g., RS232, RS422, TTL, 4–20 ma, 0–5 v, 0–10 v, and so forth). Alternate industry standard methods, such as wireless radio transfer or superimposing data on the existing AC lines of the sprinkler system 10, could also be used.

Upon receiving the azimuth value from the control unit 31, the main controller 21 uses the azimuth value to control one or more functions of the irrigation system 10. For example, the azimuth value can be used to start and stop the end gun 18 of the irrigation system 10 at predetermined angular positions around the center pivot point 11. This allows the end gun 18 to be started and stopped with a high degree of accuracy as to the position of the end tower 13n in the field. As a result, the operation of the end gun 18 operation can be optimized, and the end gun 18 will perform consistently during every pass of the sprinkler system 10 around the field.

The main controller 21 can also use the azimuth value received from the control unit 31 to automatically stop, reverse a direction of movement, or change an application rate of the sprinkler system 10 at predetermined angular positions or locations in the field. The main controller 21 can also use the azimuth value to activate an auxiliary output, for example, to shut off one or more of the towers 13a–13n or to shut off selected nozzles or sprinkler heads 17 of the irrigation system 10 at predetermined angular positions. In general, the main controller 21 can use the calculated azimuth value received from the control unit 31 to control any system functions that were previously controlled using an encoder or the like positioned at the pivot center 11.

Figure 6:
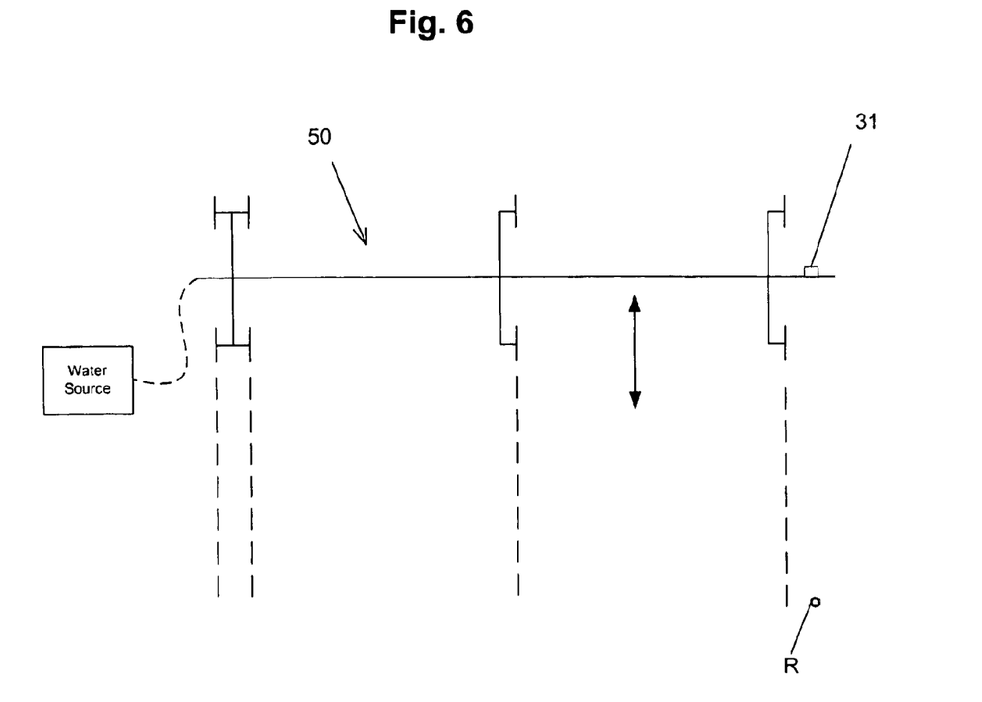
FIG. 6 is a plan view of a linear move irrigation system equipped with the GPS-based controller of the present invention.

The GPS-based controller 30 of the present invention can also be used for linear irrigation systems. A linear move irrigation system 50 is shown in FIG. 6. In this case, the output of the control unit 31 will correspond to distance of travel from a reference point R, instead of degrees of movement around a pivot point.

Linear irrigation systems typically travel long distances moving straight in one direction along a field. These systems also typically utilize electronic controls for programmable operation. The linear systems use distance traveled from a starting position or "zero point," which is typically where the linear system rests at the end of the field. The control unit 31 can be mounted at any selected point on the linear move irrigation system.

As in the center pivot system 10, setup of the linear move system will require programming in the coordinates of a starting position or "zero point" (similar to recording the coordinates of the pivot center 11). This can be achieved by keyboard input using the serial port connector 38, or by plugging in the jumper 40 for "base setup" mode, and then powering the unit 31. Upon power up, the unit 31 will search for satellites 41, 42 and WAAS signal using the GPS antennae 33 and the GPS receiver 32. When there are sufficient satellites 41, 42 in view and the WAAS signal is detected, the unit 31 will detect the presence of the base setup mode jumper 40 and will go into a "learn" mode and average the position of the zero point based on the signals detected by the GPS receiver 32. When the averaging is done, the latitude and longitude of the starting point are saved in the non-volatile memory 40 as a first set of coordinates.

Once the zero point is established, the base setup mode jumper 40 is removed and the control unit 31 is used to calculate distance traveled by the linear system as it traverses a field being irrigated. Specifically, the GPS antennae 33 and GPS receiver 32 are used to generate a second set of latitude and longitude coordinates corresponding to a traveled position of the linear move system. The second set of coordinates is output to the microprocessor 34, and a distance traveled by the selected point from the starting position to the traveled position is calculated by comparing the first and second sets of coordinates.

The distance traveled value is then transmitted to the main controller of the linear move system and used to control one or more functions of the irrigation system. For example, the distance traveled value can be used to control an end gun, to automatically stop or reverse the irrigation system at a predetermined position, or to change an application rate of the irrigation system.

Figure 5:
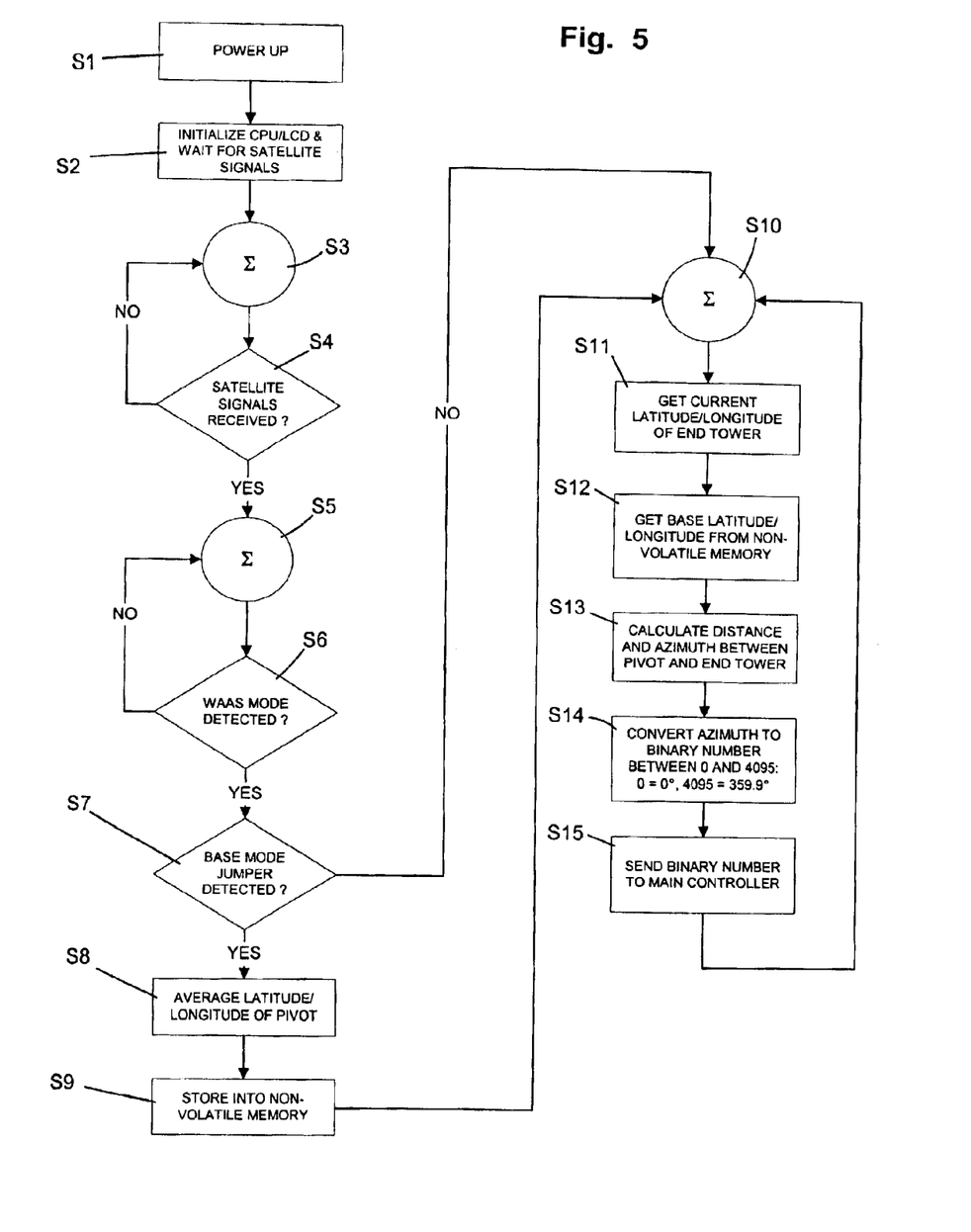
FIG. 5 is a flow chart of the main processing steps used by the GPS-based controller of the present invention.

FIG. 5 shows the main processing steps used in the operation of the GPS-based controller 30 of the present invention. The controller 30 is first powered up in step S1, then the microprocessor 34 and LCD display 37 are initialized in step S2. The controller 30 then searches for available GPS signals in steps S2 to S4 until suitable GPS signals are detected and received by the GPS receiver 32. In steps S5 and S6, the controller 30 continues to monitor the available GPS signal until WAAS mode or other suitable correction signals are available to enhance the accuracy of operation.

Once WAAS mode is detected, it is then determined in step S7 whether the base mode jumper 39 is attached. If the jumper 39 is attached, the controller 30 goes into the setup mode in step S8 and receives the first set of latitude and longitude coordinates corresponding to the pivot point 11 or other stationary reference point. The first set of latitude and longitude coordinates are then stored into the non-volatile memory 40 in step S9, and the control routine of the controller 30 continues on to steps S10 to S15.

In step S11, the microprocessor 34 receives the current latitude and longitude of the end tower 13n or other reference point on the sprinkler 10 (i.e., the second set of coordinates). In step S12, the microprocessor 34 retrieves the first set of latitude and longitude coordinates from the nonvolatile memory 40. The microprocessor 34 then calculates the distance and azimuth of the end tower 13n relative to the center pivot point 11 in step S13. The azimuth is then converted into a binary number between 0 and 4095 in step S14, and the binary number is then sent from the control unit 31 to the main controller 21 in step S15. As explained above, the main controller 21 uses the signals received from the control unit 31 to control one or more functions of the irrigation system 10.

It will be appreciated that certain features of the present invention described above can be changed without departing from the scope of the invention. For example, the GPS-based controller of the present invention can be positioned on any of the towers of a sprinkler system, and the phrase "end tower" as used herein in connection with a center pivot sprinkler system means any suitable location along the sprinkler system that is remote from the pivot point. Also it will be understood that the GPS receiver is capable of receiving other error correcting signals instead of, or in addition to, WAAS. These corrections can be utilized by the GPS receiver using any industry established method (e.g., satellite corrections such as Omnistar or Coast Guard radio beacons).

While the invention has been specifically described in connection with specific embodiments thereof, it is to be understood that this is by way of illustration and not of limitation, and the scope of the appended claims should be construed as broadly as the prior art will permit.

What is claimed is:

1. A method of controlling a center pivot irrigation system having a center pivot point, an end tower, and a single GPS receiver, comprising the steps of:

programming a microprocessor associated with the single GPS receiver by storing a first set of latitude and longitude coordinates corresponding to a position of the center pivot point in a nonvolatile memory of the microprocessor;

receiving global positioning signals at the end tower using said single GPS receiver and using said signals to generate a second set of latitude and longitude coordinates corresponding to a position of the end tower;

outputting said second set of coordinates to the microprocessor;

calculating the azimuth between the center pivot point and the end tower using the first and second sets of coordinates; and using the calculated azimuth to control a function of the center pivot irrigation system.

2. The method according to claim 1, wherein the step of programming the microprocessor comprises temporarily placing said single GPS receiver at the center pivot point, and using global positioning signals received by the single GPS receiver to calculate the first set of coordinates corresponding to the position of the center pivot point.

3. The method according to claim 2, wherein the step of receiving global positioning signals at the end tower comprises placing said single GPS receiver at the end tower after the microprocessor is programmed with the first set of coordinates.

4. The method according to claim 3, wherein said microprocessor and said GPS receiver are provided in a unit which contains a power supply and transmitting circuitry for communicating with a main controller of the irrigation system.

5. The method according to claim 1, wherein the calculated azimuth is used to control an end gun of the center pivot irrigation system.

6. The method according to claim 1, wherein the calculated azimuth is used to automatically stop the irrigation system at a predetermined position.

7. The method according to claim 1, wherein the calculated azimuth is used to automatically reverse a direction of movement of the irrigation system at a predetermined position.

8. The method according to claim 1, wherein the calculated azimuth is used to change an application rate of the irrigation system.

9. The method according to claim 1, wherein the calculated azimuth is used to control an auxiliary output of the irrigation system.

10. The method according to claim 1, further comprising the step of using the single GPS receiver to receive an error correcting signal at the end tower and using the error correcting signal to improve the accuracy of the second set of coordinates corresponding to the position of the end tower.

11. The method according to claim 1, wherein the step of programming the microprocessor comprises using a keyboard to input the first set of coordinates corresponding to the position of the center pivot point into the microprocessor for storing in said nonvolatile memory of the microprocessor.

12. A method of controlling a linear move irrigation system having a single GPS receiver, comprising the steps of:

programming a microprocessor by storing a first set of latitude and longitude coordinates corresponding to a starting position of a selected point on the linear move irrigation system in a nonvolatile memory of the microprocessor;

receiving global positioning signals at the selected point using said single GPS receiver as the irrigation system moves linearly across a field and using said global positioning signals to generate a second set of latitude and longitude coordinates corresponding to a traveled position of the selected point;

outputting said second set of coordinates to the microprocessor;

calculating a distance traveled by the selected point from the starting position to the traveled position using the first and second sets of coordinates; and using the calculated distance traveled to control a function of the linear move irrigation system.

13. The method according to claim 12, wherein the step of programming the microprocessor comprises placing said single GPS receiver at the selected point, and using global positioning signals received by the single GPS receiver to calculate the first set of coordinates corresponding to the starting position.

14. The method according to claim 13, wherein said microprocessor and said GPS receiver are provided in a unit which contains a power supply and transmitting circuitry for communicating with a main controller of the irrigation system.

15. The method according to claim 12, wherein the calculated traveled distance is used to control an end gun, to automatically stop or reverse the irrigation system at a predetermined position, or to change an application rate of the irrigation system.

16. The method according to claim 12, further comprising the step of using the single GPS receiver to receive an error correcting signal at the selected point and using the error correcting signal to improve the accuracy of the first and second sets of coordinates corresponding to the starting position and the traveled position, respectively.

17. A control system for irrigation systems, comprising:
   a power supply;
   a non-volatile memory for storing a first set of latitude and longitude coordinates corresponding to a reference position for the irrigation system;
   a single GPS receiver having receiving circuitry for receiving global positioning signals and using said signals to generate a second set of latitude and longitude coordinates corresponding to a current position of the irrigation system;
   a microprocessor means for calculating the azimuth and the distance between the reference position and the current position of the irrigation system using the first and second sets of coordinates; and
   means for controlling a function of the irrigation system based on at least one of the calculated azimuth and distance.

18. The control system for irrigation systems according to claim 17, wherein the irrigation system is a center pivot irrigation system, said reference position is a center pivot point of the irrigation system, said current position is measured from a point on an end tower of the irrigation system, and said controlling means controls a function of the irrigation system based on the calculated azimuth between the center pivot point and the end tower.

19. The control system for irrigation systems according to claim 18, wherein said controlling means controls operation of an end gun of the irrigation system.

20. The control system for irrigation systems according to claim 17, wherein said controlling means provides a means for stopping, reversing and/or changing an application rate of the irrigation system at a selected distance or azimuth value between the reference position and the current position.

21. The control system for irrigation systems according to claim 17, wherein the irrigation system is a linear move irrigation system, said reference position is a starting position of a selected point on said irrigation system, said current position is measured from the selected point on the irrigation system, and said controlling means controls a function of the irrigation system based on the calculated distance between the starting position and the current position of the selected point on the irrigation system.

22. The control system for irrigation systems according to claim 17, further comprising a means for converting the calculated azimuth into a binary number between 0 and 4095, and for transmitting the binary number to a main controller of the irrigation system.

23. The control system for irrigation systems according to claim 17, wherein said single GPS receiver has a mode for receiving WAAS correction signals.

* * * * *